Nov. 3, 1959    J. B. BRADY    2,911,462
METHOD FOR TRANSLATING AND SILENTLY REPRODUCING LANGUAGES
Filed Sept. 24, 1952    2 Sheets-Sheet 1
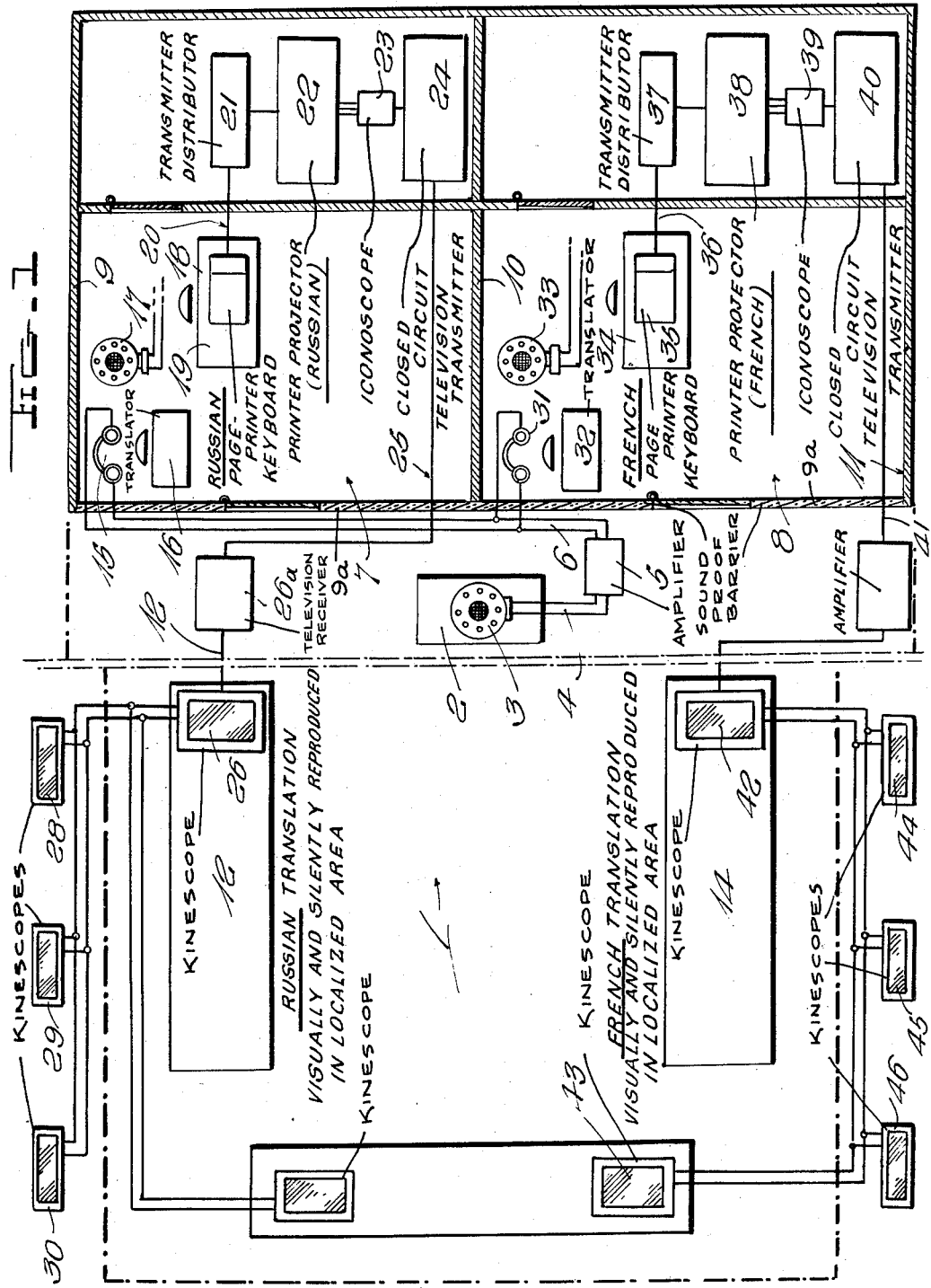
INVENTOR
John B. Brady

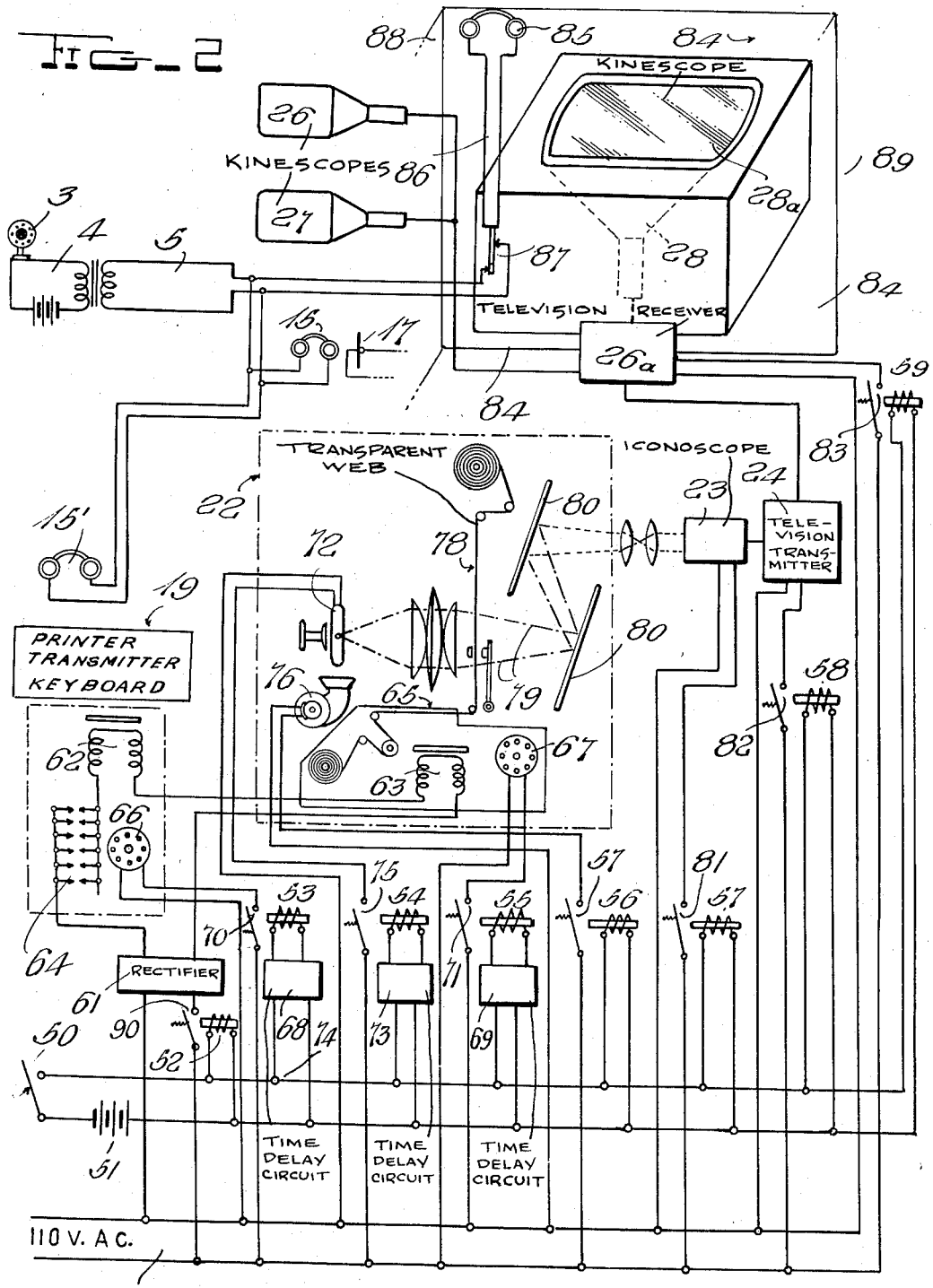

United States Patent Office
2,911,462
Patented Nov. 3, 1959

2,911,462
METHOD FOR TRANSLATING AND SILENTLY REPRODUCING LANGUAGES

John B. Brady, Somerset, Md.

Application September 24, 1952, Serial No. 311,298

2 Claims. (Cl. 178—5.6)

My invention relates broadly to a system for interpreting languages and more particularly to an electronic system and apparatus for language interpretation.

One of the objects of my invention is to provide a system for interpreting languages by visual display of translations of the language context in different languages in accordance with the oral delivery thereof in one language.

Another object of my invention is to provide the composite telegraphic and television system for displaying the context of languages in accordance with translations in various and different languages substantially simultaneously with the oral delivery of the context in a certain language.

Still another object of my invention is to provide means for facilitating rapid understanding of groups of individuals skilled in various and different languages upon oral rendition of a language in a certain context which may be generally unknown to many of the individuals.

Still another object of my invention is to provide a visual method for the exchange of understanding between speakers in one language with groups of listeners unfamiliar with the spoken language.

Still a further object of my invention is to provide a system for silently and visually displaying various and different translations of an orally rendered speech, wherein visual displays of translations may be viewed by those skilled in particular languages for facilitating the interchange of ideas between the speaker and the listening groups.

Other and further objects of my invention reside in a system for the visual display in a silent manner of the spoken language for coordinating the activities of groups of individuals variously and differently skilled in various languages in understanding the delivery of speech in a language generally unknown to the said groups of individuals, as set forth more fully in the specification hereinafter following, by reference to the accompanying drawings, in which:

Figure 1 is a schematic view of the arrangement of the apparatus for carrying out the system of my invention; and Fig. 2 schematically shows the circuit arrangement for controlling the operation of the system of my invention from the typist's position adjacent the translator in the sound-proof booth.

My invention is directed to a system for visually interpreting a language and visually reproducing a language in various and different languages as distinguished from the particular language in which a speech may be rendered and wherein the different translations of the rendered speech are visually reproduced in a silent manner substantially concurrently with the rendition of the speech in a certain language.

My invention contemplates the display of translations of the language in which a speech may be rendered where the translations are visually reproduced in a silent manner in visual range of groups of individuals familiar with the particular language in which the translation is visually displayed for facilitating an understanding between the various foreign language groups and the speaker orally speaking in a language generally unknown to the foreign language groups.

My invention finds application particularly in the activities of the United Nations Assembly wherein a speaker in addressing various foreign language groups may not be well understood by many of the listeners. With the system of my invention, however, the various and different foreign language groups are provided with a visual display translation of the speech being rendered in the generally unknown language, the translation being displayed silently to avoid distraction to the speaker and in positions where the translation is visually observable by the groups skilled in the language of the translation. Any device for visually reproducing the translation which is acompanied by noise in its operation is unsuitable as it is a distraction to the speaker. Where several such visual display devices for translations in different languages are employed, the combined noise of the different devices would be so distracting that such method would be impracticable. Hence in the system of my invention I employ visual reproducing devices for each of the translations which are noiseless in their operation and which may be mounted within the areas occupied by the particular language groups to which the translation is applicable.

In addition to the application of the system of this invention to United Nations Assembly operation, the invention has application to international conference work, such as the Moscow Conference of 1952 where representatives of many nations were addressed in assembly but in which the addresses were virtually ineffective for many of those in attendance due to their lack of understanding of the language used by the speakers.

In the system of my invention, translations of such addresses are visually displayed silently to the individuals familiar with the translation substantially concurrently with the rendition of the speech in the generally unknown language, thereby promptly informing the assembly of the points made by the speaker.

The system of my invention also has application in diplomatic relations generally where representatives of various nations familiar with their individual languages may be quickly informed of the speech rendered in a generally unknown language.

The system described herein solves the dilatory translation problems existing under the circumstances of the Panmunjom truce conferences in North Korea where differences in languages caused such devastating and harmful delays in the communication of thoughts between military negotiators.

In addition to the foregoing application of the invention, the system herein is useful in the instruction of students in foreign languages enabling visual comparison to be made of known and unknown languages concurrently with oral delivery of one of the languages and the visual display of a translation thereof silently and substantially concurrently with the original delivery. Visual comparison of two languages greatly decreases the time period required for instruction of students.

The principles of my invention are set forth with more particularity in the accompanying drawings wherein reference character 1 designates an assembly hall for representatives of nations where groups of representatives skilled and familiar with particular languages are located in predetermined areas. For purposes of illustration, I have designated the rostrum of the auditorium by reference character 2 where the speaker delivers an oration which is picked up by microphone 3 and carried over line wire circuit 4 through amplifier 5 to the distribution circuit 6 leading to various sound-proof, glass enclosed, booths, designated, for example, at 7 and 8 within the visual range of the auditorium 1 but separated therefrom by the sound-proof barriers designated at 9, 9a, 10 and 11. A sound-proof booth of this character is provided for each language which is to be visually displayed within the area of auditorium 1. The sound-proof barrier 9a is also transparent to provide a view of the proceedings in the auditorium from the sound-proof booths. For purposes of explaining the invention, facilities are shown for display of translations of the speech rendered in English at rostrum 2 in the Russian language in the area 12 of the auditorium 1 and in the French language within the area 14 in the auditorium 1. The equipment in sound-proof booth 7 is arranged for controlling the display of the translation of the English speech from rostrum 2 in the Russian language within the area 12 of the auditorium while the equipment in sound-proof booth 8 is arranged for visual reproduction of the English speech from rostrum 2 in the French language in the area 14 of the auditorium 1.

Sound-proof booth 7 includes a telephone headset connection 15 to distribution circuit 6 leading from the rostrum where the attendant skilled in the Russian language is located at the desk position 16 who translates the received English speech from rostrum 2 into the Russian language and speaks into microphone 17 leading to the conventional telephone reproducing circuits heretofore employed in assemblies of the general character described herein. A typist skilled in the Russian language occupies desk position 18 and from the dictation of the Russian translator in the position 16 operates the page printer Teletype keyboard 19 of, for example, the Model 15 type Teletype set, or the keyboard tape perforator equivalent thereof which is electrically connected through the circuit diagrammatically indicated at 20 to equipment installed in a position remote from booth 7 and which includes, in the case of the keyboard perforator, an automatic transmitter arrangement and transmitter distributor 21 which operates into the printer projector unit 22 of the general character set forth in more detail in United States Letters Patents 2,420,029 of May 6, 1947, for Printing Telegraph Transmission and Reception System, and 2,429,921 of October 28, 1947, for Facsimile Transmission System.

Where the Model 15 keyboard transmitter is used for the direct operation of the printer projector unit 22, the transmitter distributor illustrated at 21 is not employed. The printer projector unit 22, however, is equipped with type pallets containing Russian language characters serving to reproduce the translation of the English speech at rostrum 2 in the Russian language on the transparent tape which passes through the printer projector unit. The image of the Russian language translation thus produced is focused upon the mosaic of the iconoscope 23 of the closed circuit television transmitter represented generally at 24. The closed circuit television transmitter 24 connects through coaxial cable 25 to the television receiver 26a and kinescope reproducing units distributed at convenient positions throughout the auditorium at 26 and 27 and to external positions 28, 29 and 30 outside of the auditorium on which the Russian language translation is visually reproduced in a silent manner offering no distraction to the English speaker at rostrum 2 even though the visual reproducing units 26 and 27 may be within close sound range of the speaker. The conference representatives familiar with the Russian language are seated in positions providing full view of the screens of the kinescopes 26 and 27 and conveniently read the speech being delivered in English at rostrum 2 in the Russian language at positions 26 and 27. The remote reproducing positions 28, 29 and 30 exterior to the auditorium provide press representatives and others with an immediate Russian translation of the speech being rendered in English at rostrum 2.

In the sound-proof booth 8 I provide a telephone headset reproducer 31 which is worn by a translator occupying desk position 32 and skilled in the French language, for example. The French translator at position 32 speaks in the French language through microphone circuit 33 which distributes in a conventional manner to telephone headset reproducers located in the French booth position in the auditorium 1. The dictation of the French translator in speaking into the microphone circuit 33 is copied by a typist skilled in the French language in the position 34 in booth 8. The French typist operates the keyboard of a page printer transmitter shown at 35 which may also be of the Model 15 type Teletype set which connects through line circuit diagrammatically shown at 36 to a position remote from booth 8. At this remote position I provide a transmitter distributor 37 in cases where a perforator keyboard is employed at position 35 and which operates into the printer projector unit 38 of the type heretofore described in connection with unit 22 and as set forth more fully in the aforesaid Letters Patents 2,420,029 and 2,429,921. Where a page printer keyboard is used at the position 35, this keyboard operates directly over line circuit 36 into the printer projector unit 38 without the utilization of an automatic transmitter and transmitter distributor.

In the case of the French language, the type pallets on the printer unit of the printer projector 38 may be in French characters. The image of the French translation reproduced on the transparent tape of the printer projector 38 is focused upon the iconoscope 39 which controls the closed circuit television transmitter represented at 40. The closed circuit television transmitter 40 operates through coaxial cable 41 to control the television receivers and kinescope reproducing units represented at 42 and 43 in convenient positions in the auditorium occupied by the French group and to positions external to the auditorium as represented at 44, 45 and 46, whereby French translations of the speech being reproduced in English at rostrum 2 are immediately distributed to positions both interior and exterior of the auditorium 1. All of the auxiliary kinescope reproducing units beyond the television receiver and kinescope units 26 and 42 may be slave units embodying simply the vertical and horizontal scanning circuit control means associated with the cathode ray tubes, and additional television receivers are not required.

The kinescope reproducers visually and silently reproduce the printed translation of the English speech being delivered at rostrum 2 without annoyance or distraction to the speaker at rostrum 2 and facilitate the understanding of those skilled in the French langauge throughout the auditorium.

In lieu of the direct keyboard operation of the Russian and French language translation circuits at 19 and 35, respectively, I may employ keyboard perforators of the Model 14 Teletype type at these positions, in which event Baudot code tapes are perforated by the typists at positions 18 and 34, respectively, and the tapes introduced into automatic transmitters for functioning the transmitter distributors 21 and 37, respectively. Such automatic operation provides for more uniform reading of the display screens of the kinescopes, although there may be some appreciable time lag between the display of the speech in the foreign language as compared to the delivery of the speech at the rostrum 2 in the English language.

In Fig. 2 I have illustrated more particularly the manner of controlling the operation of the complete system from the typist's position in one of the booths. The entire system is controlled by a circuit closer 50 in a position convenient to the typist's position at the transmitting keyboard 19. The switch 50 closes a circuit through a suitable source 51 to a multiplicity of remote relays which I represent at 52, 53, 54, 55, 56, 57, 58 and 59, located at the different apparatus positions for controlling the power supply in predetermined timed sequence to different parts of the apparatus. For example, relay 52 controls contacts 90 for closing the circuit from the power source 60 to the rectifier 61 which furnishes D.C. to the magnet circuit 62 of the keyboard transmitter 19 and the magnet circuit 63 of the printer projector 22. The signal permutations and combinations are controlled through the transmitting contacts operated by keyboard 19 and shown generally at 64 for controlling the typing unit 65 of the printer projector 22 through magnetic selector 63. Inasmuch as rectifier 61 is generally of the electron tube type, a reasonable time is required for conditioning the rectifier to electron emitting temperature so that relay 52 is closed immediately upon the closing of the operator's switch 50. However, the driving motors 66 of the transmitter keyboard 19 and driving motor 67 of printer projector 22 are delayed in the starting operation by means of time delay circuits 68 and 69 which are interposed between the power supply source 60 and relay windings 53 and 55, respectively, so that the driving motors start at a predetermined time after the closing of the master switch 50, whereupon relay windings 53 and 55 are excited and close contacts 70 and 71 for starting motors 66 and 67.

A similar time delay is provided for lighting the projection lamp 72 in the printer projector 22 by operation of relay winding 54 which connects through time delay circuit 73 with the control circuit 74 leading to the control switch 50. Relay winding 54 is energized at a predetermined after the closing of master switch 50 causing the closing of relay contacts 75 and the lighting of projection lamp 72.

The motor for the blower 76 is started immediately upon closing of master switch 50 by energization of relay winding 56 and the closing of contact 77 leading to the power supply source 60. Projection lamp 72 is thus protected against excessive heat from the time the lamp is initially excited for projecting light rays through the transparent tape or web 78 on which typing unit 65 is recording the translation of the English speech being rendered at rostrum 2 for the projection of the light beam 79 through the optical system indicated generally at 80 for focusing the image of the translation on the mosaic of the iconoscope 23.

The power to the iconoscope is supplied through relay contacts 81 which are closed by means of relay 57 upon operation of master switch 50.

The power circuit to the closed circuit television transmitter 24 is completed by closing relay contacts 82 under control of relay winding 58 which is operated immediately upon the closing of master switch 50.

The power circuit to the television receiver shown at 26a is closed by means of relay winding 59 which closes contacts 83 supplying power to the television receiver at its remote location fom the control position. The television receiver is shown connected with kinescopes 26 and 27 within the visual range of the groups of individuals familiar with the translation displayed on the screens thereof. In addition, the kinescope 28, which is one of the remote kinescopes referred to in Fig. 1, may be arranged within a student's booth 84 in a remote location with respect to the auditorium where the student is provided with a telephone headset 85 connected to plug and jack conection 86–87 with the circuit 6 leading to the output of the amplifier 5 which supplies the direct reproduction of the speech being delivered at rostrum 2. Thus the student in booth 4, protected within the substantially sound-proof confines thereof by means of partitions 88 and 89, is able to listen to the English rendition of the speech orginating from rostrum 2 while visually observing the Russian translation occurring substantially simultaneously on the screen 28a of kinescope 28, thereby facilitating the instruction of the student in the language the student is endeavoring to learn.

I have illustrated the system herein capable of reproduction of the English speech visually in Russian and French translations, but it will be understood that the same principles may be employed in further multiple and simultaneous and silent visual display of translations in other languages such as German, Swiss, Dutch, Spanish, etc., facilitating the coordinated operation of many groups of individuals skilled in different languages for the promotion of diplomatic and international cooperation. The important fact to bear in mind is that visual reproductions must be effected silently in localized positions adjacent the original speaker to avoid distraction of the speaker.

I may employ multiplex circuits for utilizing the same printer projector, iconoscope and closed circuit television transmitter for all of the foreign language translation visual reproducing circuits for more economically employing the transmission equipment and operating kinescope circuits in multiflex timed sequence.

I have selected the languages herein merely for purposes of illustration, and it will be understood that the system of my invention is applicable to various and different languages. It will also be understood that the system, while explained in connection with United Nations practices, is applicable as hereinabove explained in similar types of international conferences, negotiations and student instruction wherever translations of one language are to be visually displayed for analysis and study.

In the operation of the system of my invention, telegraphic signal permutation and combination code characters corresponding to the translations are produced subject to the operation of the page printer keyboards 19 and 35. These telegraphic signal permutations and combinations function the printer projector units 22 and 38 where the keyboard transmitters are employed for direct operation, or where the keyboards 19 and 35 operate perforators, the tapes developed thereby are employed to automatically control the printer projector units 22 and 38 through transmitter distributors 21 and 37. The printer projectors 22 and 38 convert the signal permutations and combinations into an image which is electronically scanned by the iconoscopes 23 and 39 which control the closed circuit television transmitters 24 and 40 for correspondingly controlling the visual reproduction of the translations through the kinescopes 26—30 at 42—46 as heretofore explained.

While I have shown in Fig. 1 the location of the typist for the Teletype transmitter as being within the booth adjacent the translator, it will be understood that the Teletype transmitter and the typist in position 18 may be remotely located with respect to the booth on a wholly different floor of the building which houses the auditorium 1 and the sound-proof booths 7 and 8 and the Teletype operator connected with a telephone circuit leading from transmitter 17 so that the same translation which is distributed to telephone circuits in the auditorium 1 is imparted to the operator of Teletype 18 over a telephone circuit. Thus the operator 18 in manipulating the Teletype transmitter keyboard may do so in surroundings where noise of operation of the Teletype transmitter keyboard will not reach either the sound-proof booth or the auditorium, thus increasing the efficiency of the system and preventing any possible noise from reaching the speaker at rostrum 2 either during the transmission process or the reproduction process.

I have selected the printer projector type of Teletype device for converting the Teletype permutations and combinations to television impulses because of the ability of the apparatus to project the last character printed without the masking or loss of a printed line of transmission generally inherent in standard Teletype equipment. This speeds up the display of the translation to those individuals focusing their attention upon the kinescope screens, such as 26, 27, 28, 29 and 30, avoiding even the delay of a single line of transmission. This is important as such additional loss of display time would so increase the appreciable lag which may occur at times between the original reception and translation that the display of the translation might unduly lag the rendition of the speech at rostrum 2. This is avoided by use of the printer projector where the last printed character is displayed as the type bar which has printed such character falls back from printing position.

The translations of the foreign languages are displayed in print as images on the kinescope screens, the translations dynamically and progressively moving upwardly line by line on the screens so that there are a multiplicity of horizontal lines continuously visible within the reading range of groups of individuals expert in the particular language being displayed. The lines are moved upwardly progressively in accordance with the transmission of line feed and carriage return signal permutations and combinations at the transparent tape or web 78. That is to say, the translation is telegraphically printed, progressively character by character, word by word, and line by line, and is optically scanned as the translation is formulated. The system of my invention employs printing telegraph apparatus operating on the start-stop permutation and combination printing telegraph transmission and reception principle, and care is taken through the use of synchronous motors 66 and 67, the start-stop mechanism of the printer transmitter keyboard 19 and printer projector 22 to maintain the formation and display of the translation in perfectly timed sequence under control of the transmitter keyboard 19. The fact that several lines of the translation are available for reading for a substantial time period, render it easier for the observers to read the entire context of the translation over a time period and understand the points being made by the speaker in a language which may not be otherwise understandable to the observers merely from the oral speech.

In the claims I have designated the rostrum 2 as the speaker's area; and the equipment which is isolated from the speaker's area by soundproof barriers 9, 10 and 11 as the transmission area. The noise inherent in the equipment required for operation of the printing telegraph apparatus is completely isolated from the speaker's area by the sound barriers. The listener is able to read the printed intelligence reproduced on the kinescopes while he is in the sight-and-sound range of the speaker on the rostrum. The intelligence reproduced in multiple line copy on the kinescopes is silently reproduced and accordingly does not interfere with the sound of the speaker's voice from the rostrum. The listener is able to simultaneously observe the speaker and hear the speaker and also read the printed information reproduced character-by-character, word-by-word and line-by-line on the kinescopes.

For the purpose of clarifying the invention in the claims I have referred to the language emanating from the speaker's rostrum as the source language and the reproduced images of the typed translations on the kinescope receiver screens as the target language.

While I have described my invention in certain preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. In an interior communication system for auditoriums and the like involving a speaker's section in which a speaker addresses an audience in a source language and a printing telegraph transmission and video conversion section separated from the speaker's section by a sound barrier in which the source language is translated into a target language for reproduction in type in the speaker's section, the method of unilaterally communicating with the audience in the presence of the speaker without audible interference with speech from the speaker which comprises receiving the source language from the speaker, translating the information from the source language to a target language, silently electronically accumulating character-by-character, word-by-word and line-by-line an electronically activated typed image of the translation of the source language, displaying the accumulated lines of the electronically activated translation adjacent both the audience and the speaker in the reading range of the audience while the audience is in a position to simultaneously observe and listen to the speaker, moving the accumulated lines of the electronically activated typed image of the translation progressively in reading range of the audience while adding to the accumulated lines of the electronically activated typed image of the translation character-by-character progressively the typed image of the target language dynamically while moving out of the range of vision the earliest of the typed images of the accumulated target language and isolating all sound incident to the electronic activation of the translation of the target language from both the audience and the speaker.

2. In an interior communication system for auditoriums and the like involving a speaker's section in which a speaker addresses an audience in a source language and a conversion section in which the source language is translated and converted into a target language separated from the speaker's section by a sound barrier for reproduction as a typed image in the speaker's section, the method of unilaterally communicating with the audience in the presence of the speaker without audible interference with speech from the speaker which comprises receiving the source language from the speaker, translating the information from the source language to a target language, silently reproducing a typed target translation of the source language, displaying the typed target translation of the source language adjacent both the audience and the speaker in the reading range of the audience while the audience is in a position to simultaneously observe and listen to the speaker, progressively moving the typed target translation of the source language in the reading range of the audience while adding to the typed target translation of the source language dynamically a continuing target translation of the source language as the translation of the source language progresses and isolating all sounds incident to the translation and conversion of the source language into the target language from both the audience and the speaker.

References Cited in the file of this patent

UNITED STATES PATENTS

| 2,208,160 | McCreary | July 16, 1940 |
| 2,420,029 | Brady | May 6, 1947 |

FOREIGN PATENTS

| 367,383 | Great Britain | Feb. 15, 1932 |